United States Patent
Prabhakar et al.

(10) Patent No.: US 7,119,924 B2
(45) Date of Patent: Oct. 10, 2006

(54) DETECTION AND SEGMENTATION OF SWEEPS IN COLOR GRAPHICS IMAGES

(75) Inventors: Salil Prabhakar, Redwood City, CA (US); Raja Bala, Webster, NY (US); Hui Cheng, Bridgewater, NJ (US); John C. Handley, Fairport, NY (US); Ying-wei Lin, Penfield, NY (US)

(73) Assignee: Xerox Corporation, Stamford, CT (US)

(*) Notice: Subject to any disclaimer, the term of this patent is extended or adjusted under 35 U.S.C. 154(b) by 715 days.

(21) Appl. No.: 09/966,030

(22) Filed: Sep. 28, 2001

(65) Prior Publication Data

US 2003/0063097 A1 Apr. 3, 2003

(51) Int. Cl.
G06F 15/00 (2006.01)

(52) U.S. Cl. .............. 358/1.9; 358/522; 358/518; 382/164; 382/167; 382/168; 382/171; 382/173; 382/281; 345/590; 345/591

(58) Field of Classification Search ........... 358/1.9, 358/522, 523, 500, 518; 382/199, 164, 168–172, 382/173, 180, 181, 194, 281, 107, 165; 345/590, 345/591; 375/240.08; 348/240.2, 242
See application file for complete search history.

(56) References Cited

U.S. PATENT DOCUMENTS

| | | | |
|---|---|---|---|
| 4,685,143 A | 8/1987 | Choate | |
| 4,991,223 A * | 2/1991 | Bradley | 382/165 |
| 5,063,604 A | 11/1991 | Weiman | |
| 5,101,440 A * | 3/1992 | Watanabe et al. | 382/168 |
| 5,222,154 A * | 6/1993 | Graham et al. | 382/162 |
| 5,264,946 A | 11/1993 | Takakura et al. | |
| 5,307,182 A * | 4/1994 | Maltz | 358/518 |
| 5,309,228 A * | 5/1994 | Nakamura | 358/500 |
| 5,311,336 A | 5/1994 | Kurita et al. | |
| 5,416,890 A * | 5/1995 | Beretta | 345/590 |
| 5,629,989 A * | 5/1997 | Osada | 382/281 |
| 5,640,492 A | 6/1997 | Cortes et al. | |
| 5,767,978 A | 6/1998 | Revankar et al. | |

(Continued)

FOREIGN PATENT DOCUMENTS

JP 11-055540 2/1999

(Continued)

OTHER PUBLICATIONS

Shafarenko, L. ; Petrou, M. ; Kittler, J.□□Histrogram-Based Segmentation in a Perceptually Uniform Color Space□□Sep. 1998□□IEEE Transactions on Image Processing, vol. 7, No. 9□□pp. 1354-1358.*

(Continued)

Primary Examiner—Kimberly Williams
Assistant Examiner—Beniyam Menberu
(74) Attorney, Agent, or Firm—Fay, Sharpe, Fagan, Minnich & McKee, LLP (57) ABSTRACT

A process for color graphics image processing, related to detection and segmentation of sweeps, is provided. An input graphics image is transformed into a three-dimensional histogram in an appropriate color space 104 (e.g., CIELUV). Two-dimensional histograms are estimated from the three-dimensional histogram 106. The two-dimensional histograms are processed to detect and segment sweeps 108. Sweep segment information from the processing of the two-dimensional histograms is combined 110. The combined sweep segment information is used to process the input graphics image to identify and segment sweeps 112. Post-processing may be optionally and selectively used to reject false alarms (i.e., areas falsely identified as sweeps) 114.

28 Claims, 6 Drawing Sheets

U.S. PATENT DOCUMENTS

| | | |
|---|---|---|
| 5,778,156 A | 7/1998 | Schweid et al. |
| 5,809,165 A * | 9/1998 | Massen ............... 382/168 |
| 5,861,871 A * | 1/1999 | Venable ............... 708/200 |
| 5,867,593 A | 2/1999 | Fukuda et al. |
| 5,917,963 A | 6/1999 | Miyake |
| 6,151,410 A | 11/2000 | Kuwata et al. |
| 6,347,153 B1 * | 2/2002 | Triplett et al. ............... 382/224 |
| 6,351,558 B1 | 2/2002 | Kuwata |
| 6,430,222 B1 | 8/2002 | Okada |
| 6,516,100 B1 * | 2/2003 | Qian ............... 382/305 |
| 6,526,169 B1 * | 2/2003 | Murching et al. ............... 382/168 |
| 6,535,633 B1 * | 3/2003 | Schweid et al. ............... 382/165 |
| 6,647,131 B1 * | 11/2003 | Bradski ............... 382/107 |
| 6,654,055 B1 * | 11/2003 | Park et al. ............... 348/242 |
| 6,721,003 B1 * | 4/2004 | Tsuruoka et al. ............... 348/240.2 |
| 6,731,792 B1 * | 5/2004 | Tanaka ............... 382/164 |
| 6,766,053 B1 | 7/2004 | Fan et al. |
| 6,771,813 B1 | 8/2004 | Katsuyama |
| 6,778,698 B1 * | 8/2004 | Prakash et al. ............... 382/164 |
| 6,803,920 B1 * | 10/2004 | Gossett et al. ............... 345/591 |
| 6,832,002 B1 * | 12/2004 | Baatz et al. ............... 382/173 |
| 6,888,962 B1 | 5/2005 | Sonoda et al. |
| 6,947,591 B1 * | 9/2005 | Risson ............... 382/164 |
| 7,016,531 B1 * | 3/2006 | Murching et al. ............... 382/164 |
| 2001/0052971 A1 | 12/2001 | Tsuchiya et al. |
| 2002/0031268 A1 | 3/2002 | Prabhakar et al. |
| 2002/0067857 A1 | 6/2002 | Hartman et al. |
| 2002/0131495 A1 * | 9/2002 | Prakash et al. ............... 375/240.08 |
| 2002/0146173 A1 * | 10/2002 | Herley ............... 382/199 |
| 2003/0016864 A1 * | 1/2003 | McGee et al. ............... 382/165 |
| 2003/0044061 A1 * | 3/2003 | Prempraneerach et al. ............... 382/164 |
| 2003/0063803 A1 | 4/2003 | Lin et al. |
| 2004/0090453 A1 * | 5/2004 | Jasinschi et al. ............... 345/723 |
| 2004/0170321 A1 * | 9/2004 | Gong et al. ............... 382/173 |

FOREIGN PATENT DOCUMENTS

| | | |
|---|---|---|
| JP | 11055540 A | 2/1999 |
| JP | 11-066301 | 3/1999 |
| JP | 11066301 A | 3/1999 |

OTHER PUBLICATIONS

Healey, Glenn, "Segmenting Images Using Normalized Color", Jan./Feb. 1992, IEEE Transactions on Systems, Man, and Cybernetics, vol. 22, No. 1, pp. 64-72.*

Riekert, Wolf-Fritz, Extracting Area Objects from Raster Image Data, Mar. 1993,IEEE Computer Graphics and Applications, vol. 13, Issue 2, pp. 68-73.*

Cheng et al, A Hierarchial Approach to Color Image Segmentation Using Homogeneity, Dec. 2000, IEEE Transactions on Image Processing, vol. 9, No. 12, pp. 2071-2082.*

Arrowsmith et al., Hybrid Neural Network System for Texture Analysis, 7th Int. Conf. on Image Processing and its Applications, vol. 1, Jul. 13, 1999, pp. 339-343.

Athitsos et al., Distinguishing Photographs and Graphics on the World Wide Web, Proc. IEEE Workshop on Content-Based Access of Image and Video Libraries, Jun. 20, 1997, pp. 10-17.

Berry et al., A Comparative Study of Matrix Measures for Maximum Likelihood Texture Classification, IEEE Trans. On Systems, Man and Cybernetics, vol. 21, No. 1, Jan. 1991, pp. 252-261.

Lee et al, Texture Image Segmentation Using Structural Artificial Neural Network, SPIE vol. 3185, pp. 58-65.

Mogi, A Hybrid Compression Method based on Region Segmentation for Synthetic and Natural Compound Images, IEEE 0-7803-5467-2, pp. 777-781.

Schettini et al., Color Image Classification Using Tree Classifier, ITIM, IAMI, The Seventh Imaging Conference, Color Science, Systems, and Applications, Nov. 1999, pp. 269-272.

* cited by examiner

DETECTION AND SEGMENTATION OF SWEEPS IN COLOR GRAPHICS IMAGES

BACKGROUND OF THE INVENTION

The present invention relates to color graphics image processing. It finds particular application in conjunction with detection and segmentation of sweeps in color graphics images, and will be described with particular reference thereto. However, it is to be appreciated that the present invention is also amenable to other like applications.

Content-based image classification has emerged as an important area in multimedia computing due to the rapid development of digital imaging, storage, and networking technologies. A reproduction system, such as a copier or a printer, strives for a pleasing rendering of color documents. Picture/graphics classifiers have been developed to differentiate between a picture image and a graphics image with high accuracy by analyzing low-level image statistics.

For example, U.S. Pat. No. 5,767,978 to Revankar et al. discloses an adaptable image segmentation system for differentially rendering black and white and/or color images using a plurality of imaging techniques. An image is segmented according to classes of regions that may be rendered according to the same imaging techniques. Image regions may be rendered according to a three-class system (such as traditional text, graphic, and picture systems), or according to more than three image classes. In addition, only two image classes may be required to render high quality draft or final output images. The image characteristics that may be rendered differently from class to class may include half toning, colorization and other image attributes.

A color output device such as a CRT computer monitor, liquid crystal display, inkjet printer, xerographic printer, etc can display a limited range of colors (the gamut of the output device). If the colors in an image do not reside wholly with in an output device gamut, a gamut-mapping algorithm is often applied to map the image colors to colors that the output device can produce. A simple approach is to preserve in-gamut colors without alteration and clip out-of-gamut colors to the closest in-gamut color. More sophisticated techniques can be used. Ideally, the gamut-mapping algorithm used should be tailored to the image type. For example, a region of smoothly varying colors should appear smoothly varying on the output device. Were the colors of a sweep to exceed the gamut of an output device, the aforementioned clipping approach will show disagreeable artifacts. In fact, it may be desirable to sacrifice color fidelity within the gamut to achieve a smooth color transition. Thus knowing that a region is, or contains, a sweep aids in color reproduction. In general, coloring schemes (gamut-mapping algorithms) are tailored for specific types of images to obtain quality reproduction. Once an image has been identified as a graphics image, further identification of image characteristics can be used to fine-tune the coloring schemes for more appealing reproductions. The most prominent characteristics of a graphics image include patches or areas of the image with uniform color and areas with uniformly changing colors. This invention focuses on the identification of the second characteristic.

One example where areas with uniformly changing color can usually be observed is in the gradient backgrounds of color business presentation slides. These areas of uniformly changing color are called sweeps and are constructed in the three-dimensional color space as a line during the construction of the synthetic graphics. A sweep is constructed by a mathematical formula to cause adjacent pixels to change color in a smooth, predictable way. For example, one can use linear interpolation of two colors specified for the sweep and render the original image by plotting pixels of interpolated colors such that neighboring spatial regions are rendered with colors from neighboring color regions. One can contemplate other mathematical descriptions of curves that achieve like effects. If such a document is printed or scanned, the sweeps do not exactly contain the colors on the line due to halftone noise introduced. If a reproduction system can correctly identify and segment the sweep areas in an image, the original sweeps can be reconstructed in the color space and rendered. The sweeps thus rendered will be very smooth and the noise introduced by the halftone will not be reproduced. Secondly, if the extreme colors of the sweep can be automatically identified, the coloring schemes can be tailored to maximize the smoothness as well as contrast and differentiation among colors to render business graphics documents.

Further identification of the properties of the graphics image can be used to fine-tune the coloring scheme to obtain a more appealing reproduction. The detection of sweeps in a graphics image can be used to reconstruct synthetic sweeps that may otherwise be perturbed due to half toning, scanning artifacts, or aging of a document or for other reasons. The extent of the sweeps (i.e., the change from color 1 to color 2) may also be used to tailor the coloring scheme to achieve best smoothness, contrast and differentiation among colors in the reconstructed sweeps.

The present invention proposes a new and improved method for detecting and segmenting sweeps in a color graphics image that overcomes the above-referenced problems and others.

SUMMARY OF THE INVENTION

In accordance with one aspect of the present invention, sweeps in a graphics image are detected and segmented. The input image is transformed into an appropriate color space (e.g., CIELUV) and sweep segment information from one or more color channel histograms of the image is detected. Then the graphics image is segmented into sweep and non-sweep areas using the sweep segment information.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
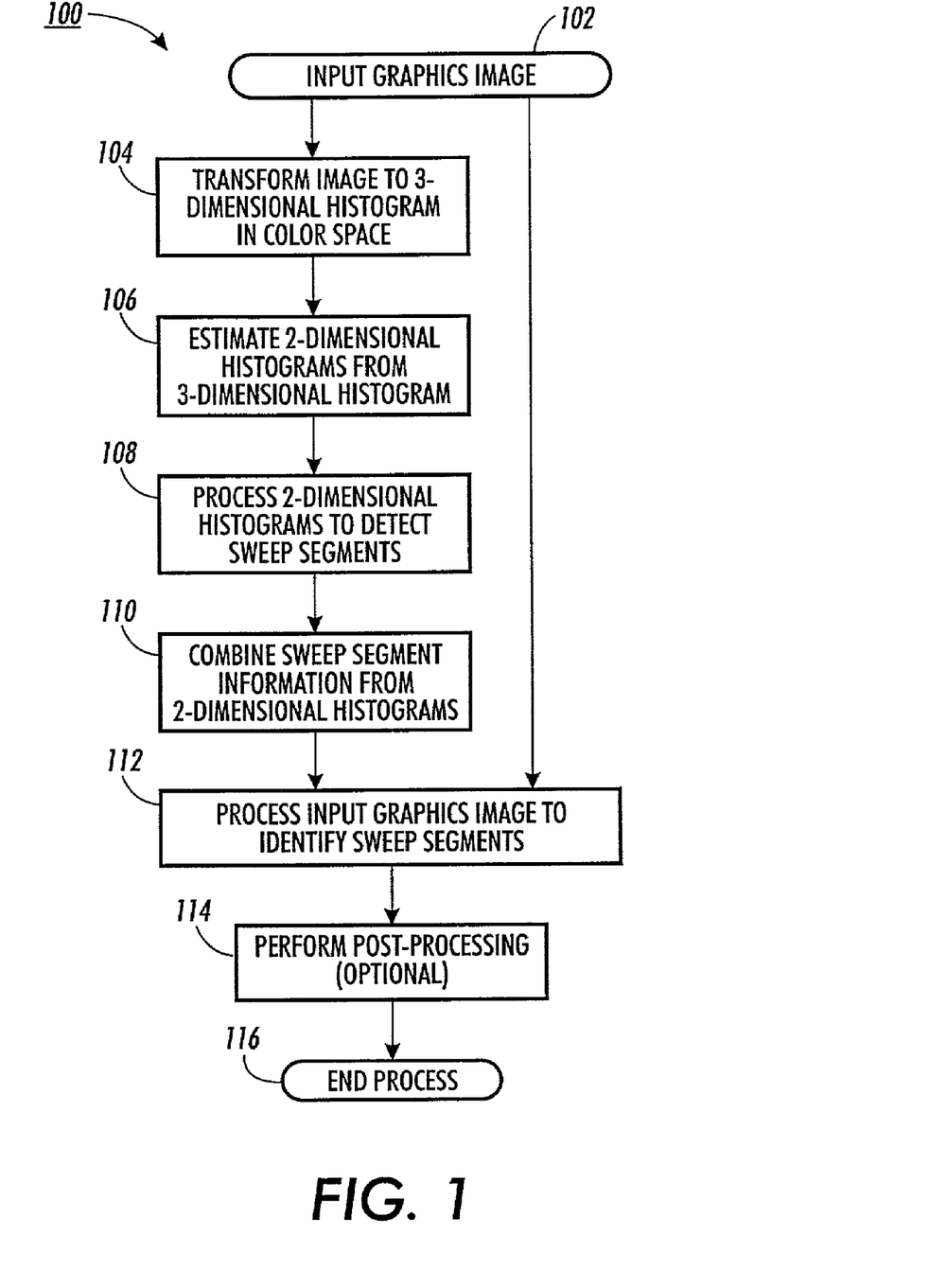
FIG. 1 is a flowchart of the process to detect and segment sweeps in a graphics image in accordance with the present invention.

With reference to FIG. 1, a flowchart of the process to detect and segment sweeps in a graphics image 100 is provided. The process 100 begins with an input graphics image 102. Next, the input graphics image is transformed into a three-dimensional histogram in an appropriate color space 104. In the preferred embodiment, the CIELUV color space is used. This space is chosen because additive mixtures of two colors 1 and 2 lie along a locus that is close to a straight line in three-dimensional CIELUV space. It also provides rough perceptual uniformity, i.e., the Euclidean distance between a pair of colors specified in CIELUV roughly corresponds to perceived color difference. Other color spaces with similar properties such as CIEL*a*b* are contemplated in this invention. Color sweeps appear as lines in the three-dimensional CIELUV color histogram. However, since further processing (e.g., edge detection, line detection, etc.) in the three-dimensional space is difficult and time consuming, the present invention operates on two-dimensional projections of the three-dimensional histogram. Lines project as either lines or points in any two-dimensional projection from a three-dimensional space. Continuing with the flowchart of FIG. 1, two-dimensional histograms are estimated from the three-dimensional histogram 106. Next, the two-dimensional histograms are processed to detect and segment sweeps 108. Sweep segment information from the processing of the two-dimensional histograms is combined 110. The combined sweep segment information is used to process the input graphics image to identify and segment sweeps 112. Post-processing may be optionally and selectively used to reject false alarms (i.e., areas falsely identified as sweeps) 114. The process ends 116 after post-processing 114 or, if post-processing is not used, after the input graphics image is processed 112.

FIG. 1 depicts an embodiment of the method of the present invention, comprising: 1) converting an input graphics image to a color space 104; 2) projecting the image to a number of planes within the color space 106; 3) detecting curves in each plane and linking overlapping curves 108; 4) associating pixels with colors that project to the detected curves in each plane with evidence that the color belongs to a sweep 108; and 5) for each pixel color, combining sweep evidence to determine whether pixels of that color are part of a sweep 110, 112. A preferred embodiment of the method of FIG. 1 uses the CIELUV color space 104, projects the image to three orthogonal planes 106, detects curves using a Hough transform and edge linking 108, identifies whether pixels are associated with colors of the detected curves with a logical label (e.g., TRUE/FALSE) 108, and uses a logical AND operation to combine sweep evidence 110, 112.

Figure 2:
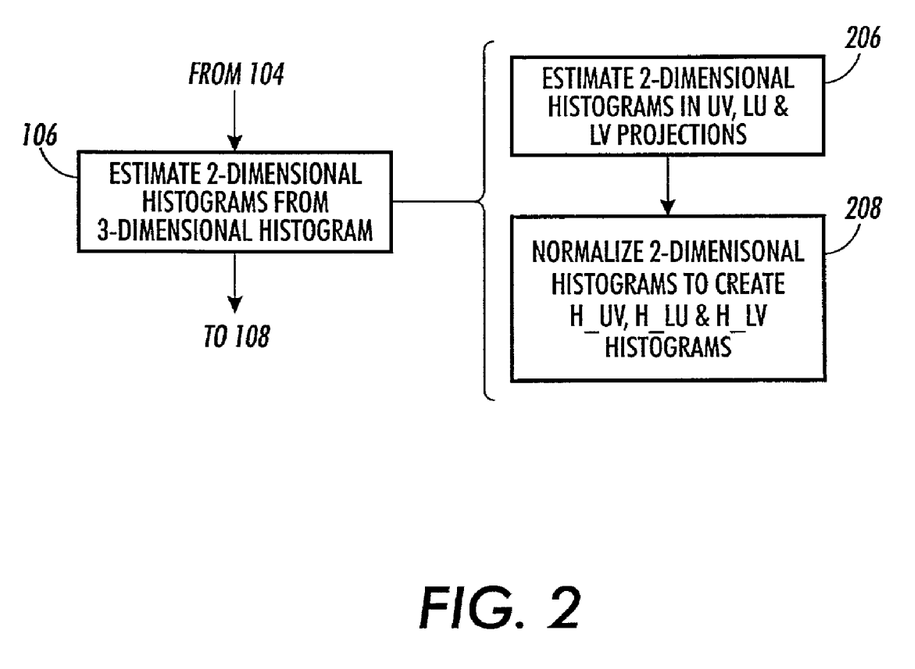
FIG. 2 shows an embodiment for sub-process 106 of FIG. 1.

With reference to FIG. 2, a preferred embodiment for estimating two-dimensional histograms from the three-dimensional histogram 106 is provided. In the preferred embodiment, the first step of the sub process estimates the two-dimensional histograms (size: GL×GL, GL is typically 256) from the input image in UV, LU, and LV projections, respectively 206. Next, the histograms are normalized by a scaling scheme to create H_UV, H_LU, and H_LV histograms, in UV, LU, and LV projections respectively 208. For example, in a scaling scheme the bin values are integers between 0 and GL-1 (typically 255). The normalized histograms are considered as gray-scale images for further processing.

Figure 3:
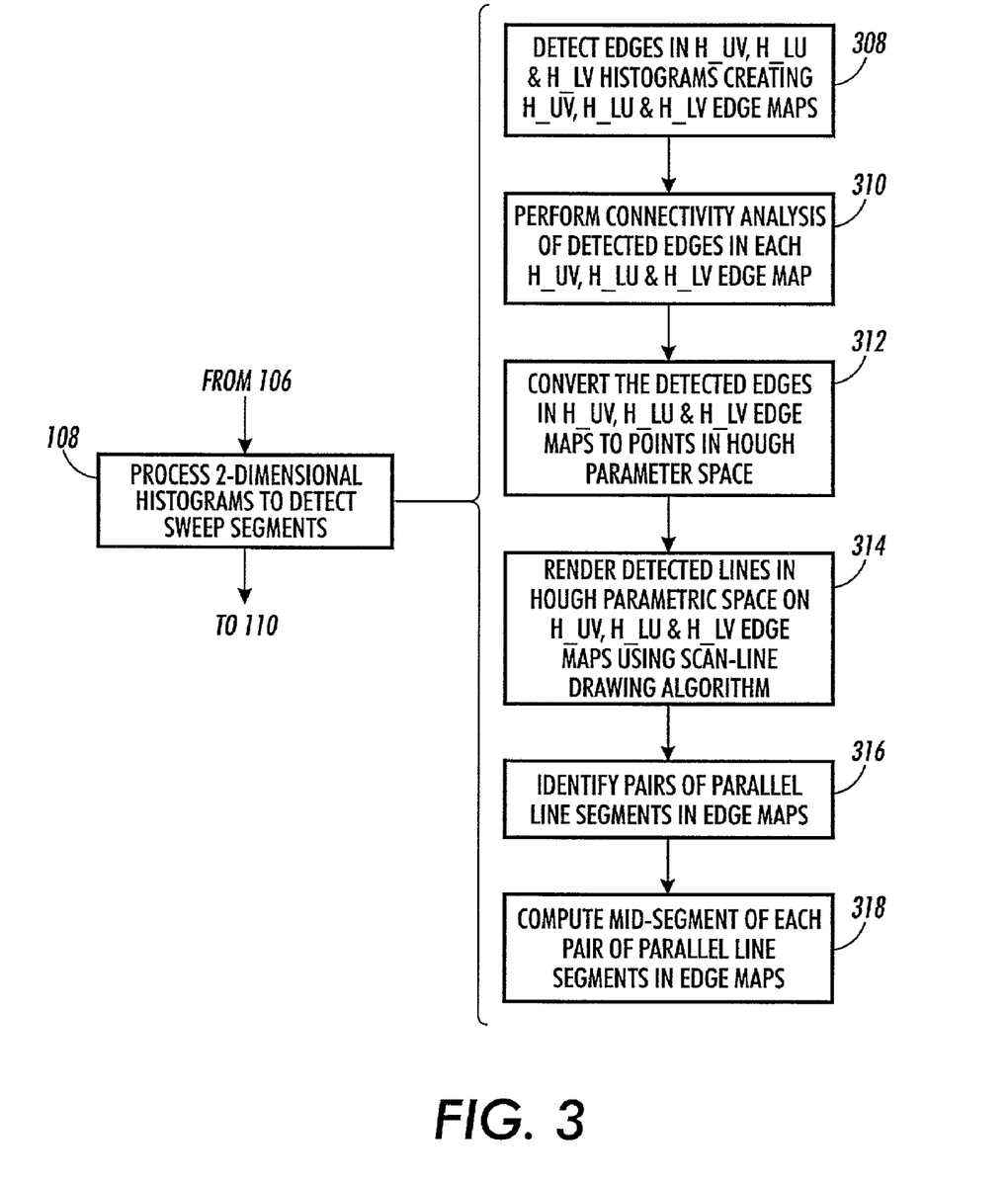
FIG. 3 shows an embodiment for sub-process 108 of FIG. 1.

With reference to FIG. 3, the preferred embodiment for processing the two-dimensional histograms to detect sweep segments 108 is provided. In the preferred embodiment, the first step of the sub process segments the H_UV, H_LU, and H_LV histograms by detecting edges and creating an edge map 308 for each projection. A standard edge detector, such as the commonly known Canny edge detector (sigma=5, mask size=51, lower threshold=0.4, higher threshold=0.9), can be used for detecting edges in the H_UV, H_LU, and H_LV histograms. The parameters identified for the edge detector were determined empirically. By using a larger mask size, thick edges are detected but small edges are missed. By using a smaller mask size, thin edges are detected but thick edges are missed. In experiments, the mask size of 51 obtained the desired balance between detecting thin and thick edges that correspond to sweeps in histogram images. Next, a connectivity analysis of the edges is performed on each of the H_UV, H_LU, and H_LV edge maps 310. For example, a standard 8-connected component algorithm can be used to perform the connectivity analysis and ignore very small edges (e.g., less than 30 pixels). Note that each sweep appears as a line segment in the histogram images and is detected as two parallel edges in the edge map. The edge maps are binary images with white pixels representing edges and black pixels representing non-edges.

With continuing reference to FIG. 3, in order to estimate the location and orientation of the sweep line segments, the detected edges in the H_UV, H_LU, and H_LV edge maps are converted to points in a Hough parametric space 312. For example, a standard Hough Transform algorithm can be used to convert the edges in the spatial domain to the Hough parametric space. Points in the Hough space with a large number of votes (i.e., more than a threshold T) are selected. Experimentally, a satisfactory threshold T can be empirically determined so that most of the lines longer than 20 pixels are detected. The selected points represent straight lines in the H_UV, H_LU, and H_LV histograms. The lines detected in the Hough space are in parametric form and run to infinity at both ends. However, identification of end points of sweeps is important.

For this purpose, each detected line in the Hough space is rendered (e.g., drawn as a 3-pixel wide line) on the edge map using a standard scan-line-drawing algorithm 314. Typically, the rendering is performed using a particular gray value (e.g., 100) and the overlap between the edges and the line drawn are marked as "overlap." The extremities of the pixels marked as "overlap" are also noted. These extremities define the line segments in the two-dimensional histogram images. As mentioned before, each sweep in the image appears as parallel line segments in the edge map. Hence, the pairs of parallel line segments in the edge maps are identified 316 and are considered for further processing while other segments are ignored. Each pair of parallel line segments correspond to a single sweep in the original image. Next, the mid segment of each pair of parallel line segments is computed 318 and recognized as a sweep.

Figure 4:
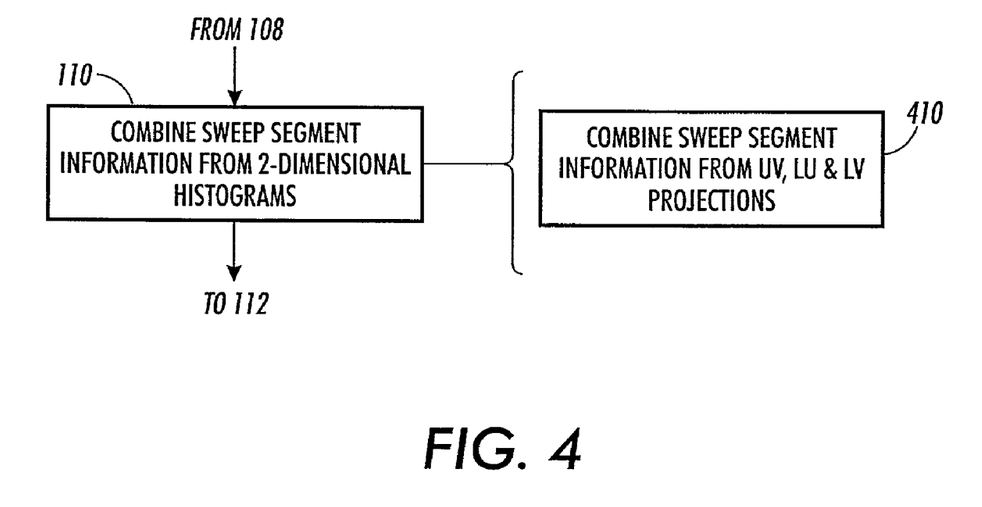
FIG. 4 shows an embodiment for sub-process 110 of FIG. 1.

The sweeps detected as segments in the H_UV, H_LU, and H_LV edge maps are projections of the original sweeps from the three-dimensional color space. Segment information consists of a data structure that indicates for each pair (u, v), (l, u) and (l, v) whether or not the pair corresponds to a sweep. To segment the input graphics image into sweep regions and non-sweep regions, the sweep segment information from the three projections must be combined. Referring to FIG. 4, a preferred embodiment for combining sweep segment information from the two-dimensional histograms 110 is provided. In this embodiment, the sweep segment information from the UV, LU, and LV projections are combined 410. A restrictive combination scheme performs an "and" operation on the information from the three projections. Specifically, the "and" condition states that a pixel with color (l, u, v) is in a sweep if and only if, from the three projections, (u, v) is a sweep AND (l, u) is a sweep AND (l, v) is a SWEEP. Alternatively, a liberal scheme performs an "or" operation on the information from the three projections: a pixel with color (l, u, v) is in a sweep if and only if, from the three projections, (u, v) is a sweep OR (l, u) is a sweep OR (l, v) is a SWEEP. The choice between restrictive and liberal combination schemes depends on the application. This invention contemplates other logical or functional combinations that may give advantage for other applications.

Figure 5:
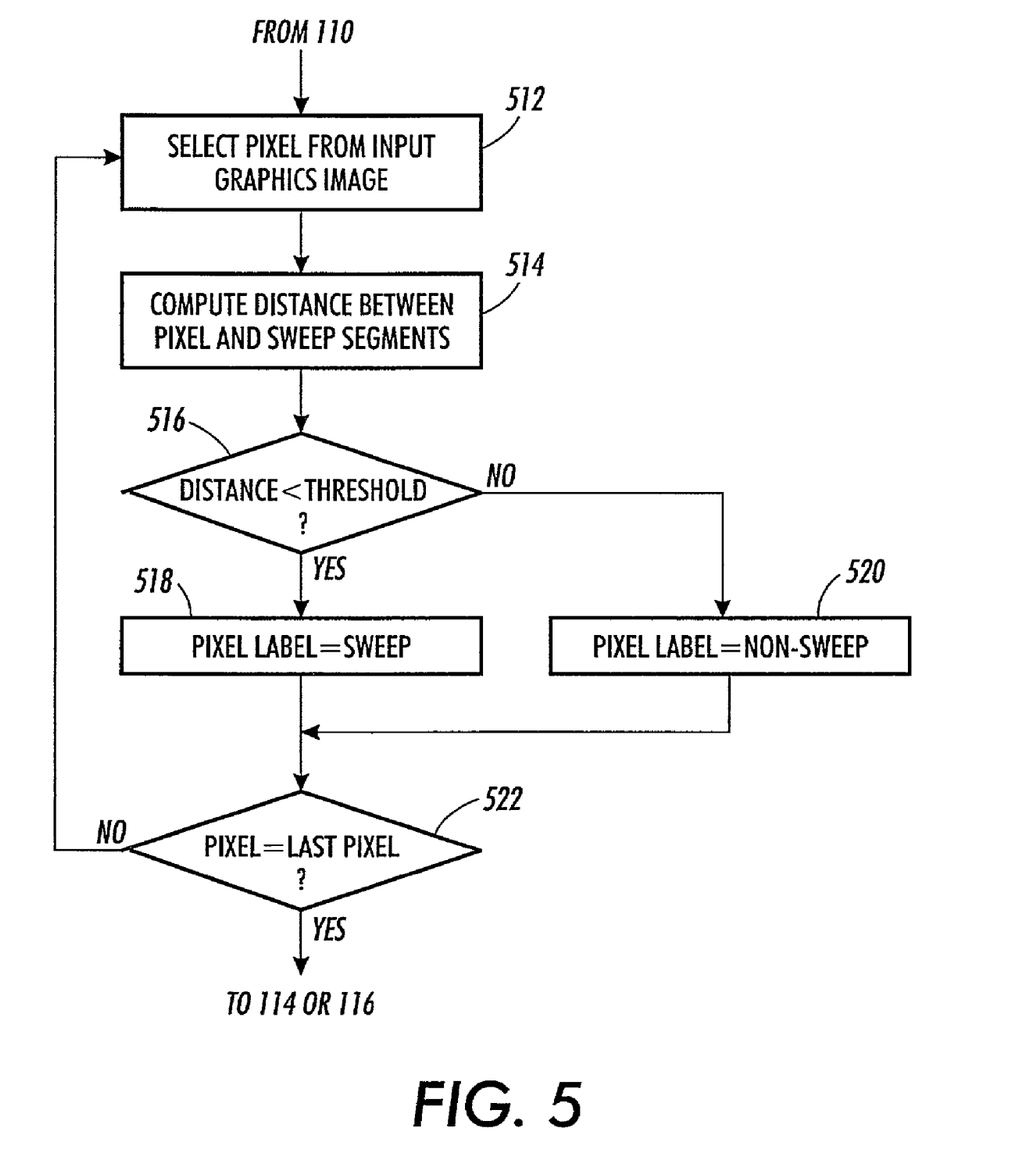
FIG. 5 shows an embodiment for sub-process 112 of FIG. 1.

Once the sweep segments in each of the H_UV, H_LU, and H_LV edge maps are identified and noted and the UV, LU, and LV projections are combined, the original graphics image is revisited. Referring to FIG. 5, a preferred embodiment for processing the input graphic image to identify sweep segments 112 is provided. In this embodiment, each pixel in the input graphics image is labeled either "sweep" or "non-sweep." The sub process begins with selection of a first pixel 512. Next, the distance between the sweep segments and the pixel is computed 514 and compared to a particular threshold value 516. If the distance is less than the threshold, the pixel is labeled "sweep" 518. Otherwise, the pixel is labeled "non-sweep" 520. Finally, the sub process determines if it has reached the last pixel 522. Until the last pixel is reached, the sub process is repeated for the next pixel. When the last pixel is reached, the sub process is complete.

Figure 6:
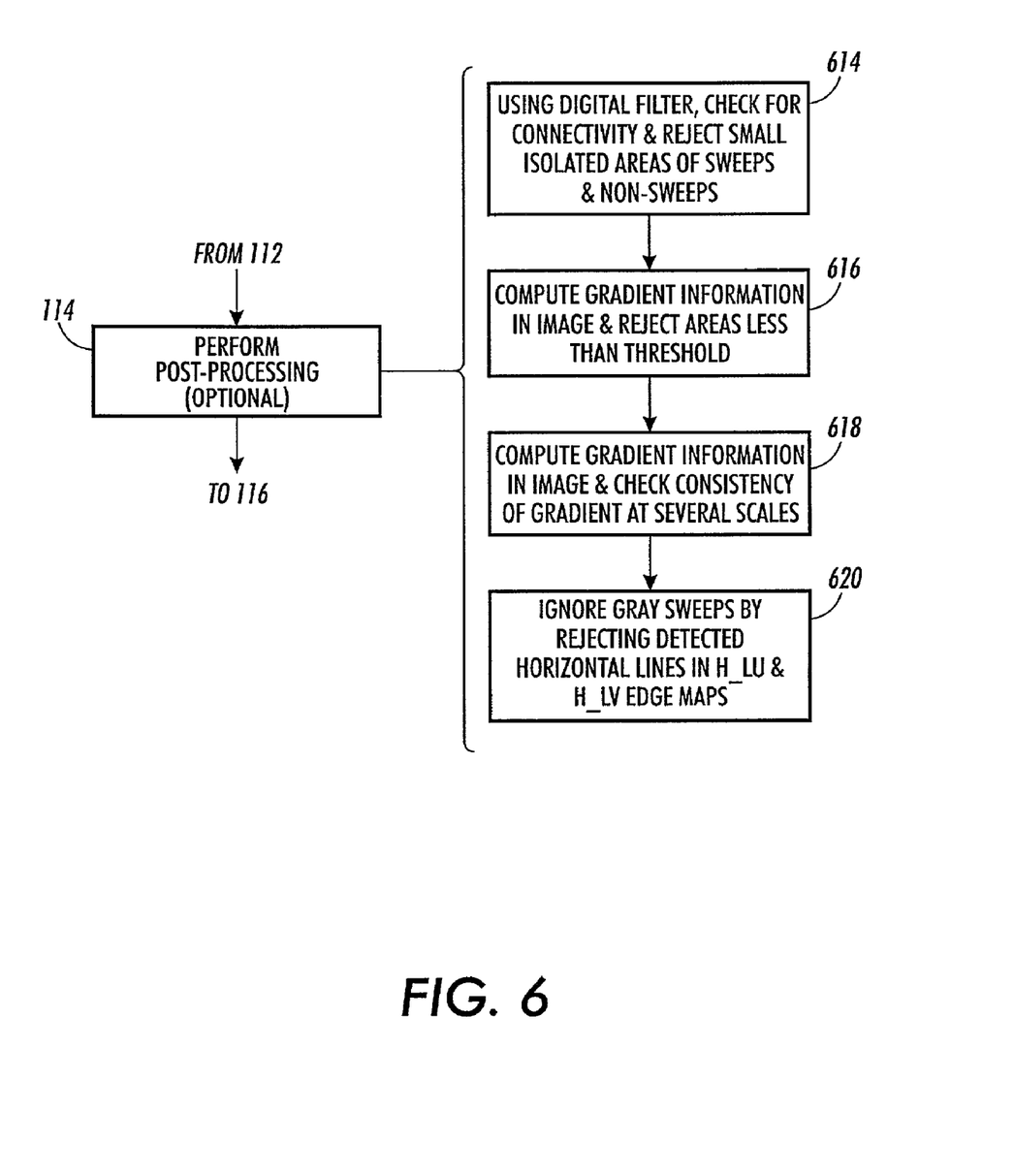
FIG. 6 shows an embodiment for optional sub-process 114 of FIG. 1.

For synthetic graphics this scheme for detecting and segmenting sweeps works well. However, for scanned graphics images, the result from this segmentation scheme may have an unacceptable number of errors. Often, for a liberal scheme, there are far more false alarms than false misses. A post-processing stage may be used to reject several types of false alarms. Referring to FIG. 6, several potential components of optional post-processing 114 are provided. The optional components may be implemented individually or in any combination. First, the post-processing scheme may use a digital filter to check for connectivity and reject small isolated areas of sweeps and non-sweeps 614. For example, a median digital filter was used in experiments. Second, the post-processing scheme may compute the gradient information in the image and reject those areas where the gradient in the image is less than a threshold 616. Third, a more sophisticated type of gradient post-processing could check for consistency of the gradient at several scales 618. Finally, the post-processing scheme may ignore gray sweeps by rejecting the detected horizontal lines in the H_LU and H_LV edge maps 620.

Although the Hough transform is used to detect straight line segments in this embodiment, known variants of the Hough methodology can be used to detect parameterized curves, surfaces, and shapes. Other color spaces and sweeps may produce other curves or surfaces in the three projections and these can be detected with methods known in the art and are within the scope of this invention.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method for detecting and segmenting sweeps in a graphics image, comprising the steps of:
    a) detecting sweep segment information from one or more color channel histograms of the graphics image; and
    b) segmenting the graphics image into sweep and non-sweep areas using the sweep segment information.

2. The method as set forth in claim 1, wherein the color channel histograms of step a) are in CIELUV color space.

3. The method as set forth in claim 1, step a) further including the steps:
    c) transforming the graphics image to a three-dimensional histogram in color space;
    d) estimating two-dimensional histograms for each of the color channels from the three-dimensional histogram; and
    e) processing each of the two-dimensional histograms to detect sweep segment information.

4. The method as set forth in claim 3, wherein the color space of step c) is CIELUV color space and the color channels of step d) are color channels in the CIELUV color space.

5. The method as set forth in claim 3, step d) further including the step:
    f) normalizing the two-dimensional histograms according to a predetermined scaling scheme.

6. The method as set forth in claim 3, step e) further including the steps:
    f) detecting edges in each of the two-dimensional histograms to create corresponding edge maps; and
    g) performing a connectivity analysis of the edges in each of the edge maps.

7. The method as set forth in claim 6, step e) further including the steps:
    h) converting the detected edges in each of the edge maps to points in a Hough parametric space;
    i) rendering lines from the Hough parametric space on the corresponding edge map; and
    j) marking the overlap between the rendered lines and curves and the detected edges on each of the edge maps.

8. The method as set forth in claim 7, step e) further including the steps:
    k) identifying pairs of parallel line segments in each of the edge maps;
    l) computing the mid-segment of each pair of parallel line segments in each of the edge maps to complete detection of the sweep segment information for each two-dimensional histogram; and
    m) combining the detected sweep segment information.

9. The method as set forth in claim 1, further including the step:
    c) performing post-processing on the input graphics image to reject segmenting that falsely identified any non-sweep portion of the image as a sweep area and vice versa.

10. The method as set forth in claim 9, wherein the post-processing includes using a digital filter to reject small isolated areas of sweeps and non-sweeps.

11. The method as set forth in claim 9, wherein the post-processing includes computing gradient information and rejecting those sweep areas where the gradient in the image is less than a threshold.

12. The method as set forth in claim 11, wherein the post-processing includes computing gradient information at several scales.

13. The method as set forth in claim 9, wherein the post-processing includes rejecting segmenting due to horizontal lines detected in the U and V color channels.

14. A method for detecting and segmenting sweeps in a graphics image, including the steps of:
   a) transforming an input graphics image to a three-dimensional histogram in color space;
   b) estimating two-dimensional histograms for each of the color channels from the three-dimensional histogram;
   c) processing each of the two-dimensional histograms to detect sweep segment information; and
   d) segmenting the input graphics image into sweep and non-sweep areas using the sweep segment information.

15. The method as set forth in claim 14, wherein the color space of step a) is CIELUV color space and the color channels of step b) are color channels in the CIELUV color space.

16. The method as set forth in claim 14, step b) further including the step:
   e) normalizing the two-dimensional histograms according to a predetermined scaling scheme.

17. The method as set forth in claim 14, step c) further including the steps:
   e) detecting edges in each of the two-dimensional histograms to create corresponding edge maps;
   f) performing a connectivity analysis of the edges in each of the edge maps;
   g) converting the detected edges in each of the edge maps to points in a Hough parametric space;
   h) rendering lines from the Hough parametric space on the corresponding edge map; and
   i) marking the overlap between the rendered lines and the detected edges on each of the edge maps.

18. The method as set forth in claim 17, step c) further including the steps:
   j) identifying pairs of parallel line segments in each of the edge maps;
   k) computing the mid-segment of each pair of parallel line segments in each of the edge maps to complete detection of the sweep segment information for each two-dimensional histogram; and
   l) combining the detected sweep segment information.

19. The method as set forth in claim 14, further including the step:
   e) performing post-processing on the input graphics image to reject segmenting that falsely identified any non-sweep portion of the image as a sweep area and vice versa.

20. The method as set forth in claim 19, wherein the post-processing includes using a digital filter to reject small isolated areas of sweeps and non-sweeps.

21. The method as set forth in claim 19, wherein the post-processing includes computing gradient information and rejecting those sweep areas where the gradient in the image is less than a threshold.

22. The method as set forth in claim 19, wherein the post-processing includes rejecting segmenting due to horizontal lines detected in the U and V color channels.

23. A method for detecting and segmenting sweeps in a graphics image, including the steps of:
   converting an input graphics image to a color space;
   projecting the image represented in the color space to a plurality of planes;
   detecting curves in each plane;
   identifying pixels of the color associated with each detected curve and storing such pixel information; and
   combining the pixel information for each color to determine if pixels of that color are part of a sweep.

24. The method as set forth in claim 23, wherein:
   the input graphics image is converted to a CIELUV color space;
   the image represented in the color space is projected to three orthogonal planes;
   curves in each plane are detected using a Hough transform and edge linking;
   pixels of the color associated with each detected curve are identified using a logical label; and
   the pixel information for each color is combined using a logical AND operation to determine if pixels of that color are part of a sweep.

25. The method as set forth in claim 1, wherein the sweep area is an area of uniformly changing colors and a non-sweep area is an area of uniform colors.

26. The method as set forth in claim 1, wherein the one or more color channel histograms include a plurality of colors.

27. The method as set forth in claim 23, wherein each pixel in the input graphics image is labeled as one of a sweep and a non-sweep based on a distance measure between a corresponding sweep segment and the pixel.

28. The method as set forth in claim 23, wherein the pixel information for each color is combined using a logical OR operation to determine if pixels of that color are part of a sweep.

* * * * *